United States Patent [19]

Alderson

[11] 4,261,113
[45] Apr. 14, 1981

[54] ANTHROPOMORPHIC DUMMY FOR USE IN VEHICLE CRASH TESTING

[75] Inventor: Samuel W. Alderson, Marina Del Rey, Calif.

[73] Assignee: Humanetics, Inc., Calif.

[21] Appl. No.: 71,176

[22] Filed: Aug. 31, 1979

[51] Int. Cl.³ .............................................. G09B 23/32
[52] U.S. Cl. ............................... 434/274; 73/432 SD
[58] Field of Search .................. 35/17; 73/12, 432 SD

[56] References Cited

U.S. PATENT DOCUMENTS

| | | | |
|---|---|---|---|
| 3,664,038 | 5/1972 | Searle | 35/17 |
| 3,707,782 | 1/1973 | Alderson | 35/17 |
| 3,755,920 | 9/1973 | Smrcka | 35/17 |
| 4,000,564 | 1/1977 | Haffner | 35/17 |

FOREIGN PATENT DOCUMENTS 2358716  3/1978  France ............................... 73/432 SD

*Primary Examiner*—Harland S. Skogquist

*Attorney, Agent, or Firm*—Fulwider, Patton, Rieber, Lee & Utecht

[57] ABSTRACT

An anthropomorphic dummy suitable for use in vehicle crash testing, wherein the dummy includes a thoracic spine, at least one arm, and a corresponding shoulder assembly for coupling the arm to the spine. Lateral forces to the arm, resulting from lateral impacts, are coupled through the shoulder assembly to the spine, where they can be measured by appropriate instruments. The shoulder assembly includes an elastically compressible member, with an embedded, floating clavicle, that attenuates the forces being coupled to the spine and that is correspondingly deformed by the forces in a prescribed fashion. Additionally, the arm includes a high-strength, plastic humerus and a resilient energy-absorbing coating overlaying the humerus, whereby both the arm and the shoulder assembly closely model the responsiveness of a human arm and shoulder to such laterally-applied forces.

13 Claims, 6 Drawing Figures

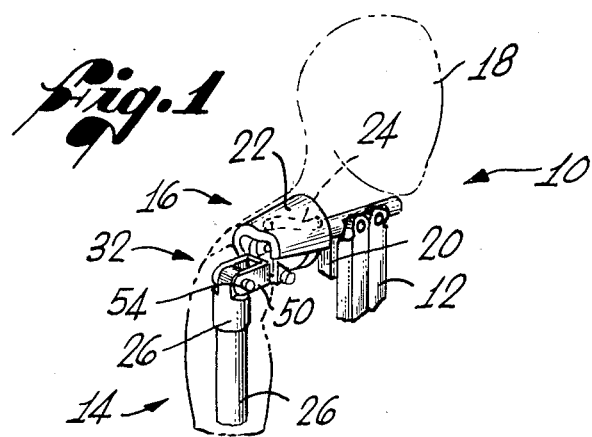
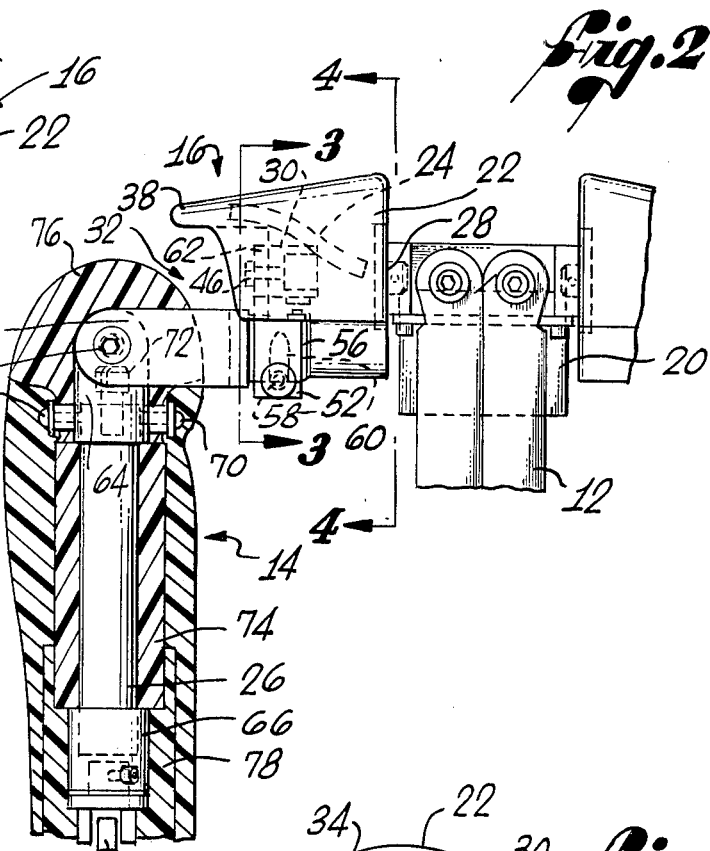
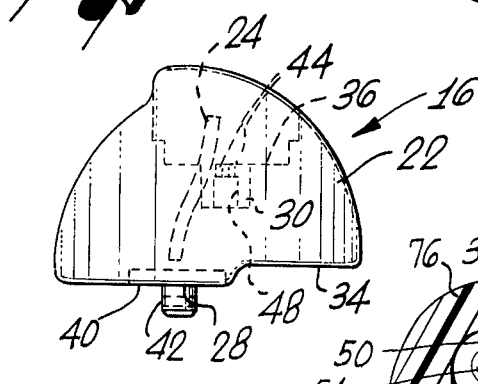
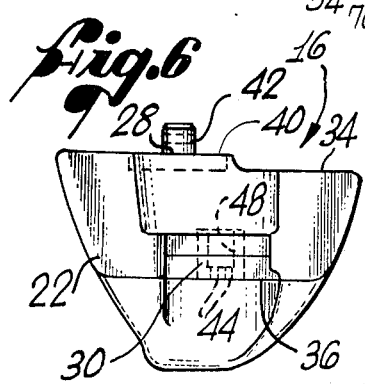
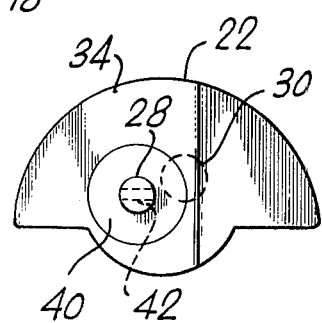
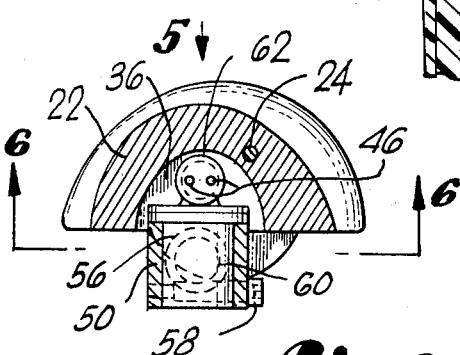

ANTHROPOMORPHIC DUMMY FOR USE IN VEHICLE CRASH TESTING

BACKGROUND OF THE INVENTION

The present invention relates generally to anthropomorphic dummies, and, more specifically, to anthropomorphic dummies for use in motor vehicle crash testing.

Anthropomorphic dummies containing sensing and recording devices have long been used in research directed toward reducing injuries suffered in motor vehicle crashes. Early research efforts dealt chiefly with injuries suffered in frontal crashes, but recently, research efforts have also been directed at improving the safety of vehicles involved in lateral or oblique angle crashes.

The dummies used in frontal crash testing have not proved completely satisfactory for use in research relating to lateral crashes, because such dummies generally do not react in lateral crashes as do human bodies. Thus, their measuring devices record accelerations and force loads which are unrepresentative of the accelerations and forces a human body would experience in similar crashes. Furthermore, the forces to be monitored in lateral crashes differ from those monitored in frontal crashes. Studies of frontal crashes are generally concerned with the energy-absorbing capacity of the vehicle, itself, and with the effect on the occupants of passenger restraints and protective padding. Studies of lateral crashes, on the other hand, are concerned with inward buckling of the vehicle doors or interior walls, cushioning effects of padding on the door, and cutting or penetrating effects that sharp edges might have on the occupants.

Typical early dummies included shoulders with metal-to-metal connections for coupling the arms to a thoracic spine, on which testing instruments are normally mounted. Such shoulders transmit forces during lateral crash testing that are not representative of the forces which a human body, having resilient members, would experience. Furthermore, such rigid metal shoulders do not accurately model the movements which a human shoulder exhibits in response to lateral forces on the arm or shoulder. Dummies without shoulders have been developed in an attempt to eliminate the problems with shoulders noted above, but, unfortunately, such shoulderless dummies cannot be used in tests in which shoulder harness seat belts are required.

Other problems experienced when typical early dummies are used in lateral crash testing relate to the metallic arm skeletons used in such dummies. While such metallic arms are generally satisfactory for frontal crash testing, they tend to penetrate and deform the protective padding on the vehicle's interior walls or doors when used in lateral crash testing, thus providing an inaccurate indication of the effectiveness of such padding.

Thus, there has developed a need for an improved anthropomorphic dummy for use in lateral crash testing of motor vehicles, wherein the dummy can better simulate the movement of a human shoulder and arm when exposed to forces arising in a lateral automobile crash. The present invention fulfills this need.

SUMMARY OF THE INVENTION

The present invention is embodied in an improved anthropomorphic dummy for use in vehicle crash testing, to determine the effectiveness of various prescribed vehicle safety features. The dummy includes a vertically-oriented thoracic spine, at least one arm, and a corresponding shoulder assembly for coupling the arm to the spine, and lateral forces, of a type encountered in lateral or oblique angle vehicle impacts, are coupled through the shoulder assembly, from the arm to the spine, where they can be measured by appropriate instruments. In accordance with one aspect of the invention, the shoulder assembly includes an elastically compressible member that functions to attenuate the lateral forces in a prescribed fashion, as they are coupled from the arm to the spine.

More particularly, the compressible member is molded of a resilient material, and the shoulder assembly further includes a spine fitting molded into an inner face of the compressible member and an arm fitting molded into an outer face of the member. The spine fitting couples the assembly to the thoracic spine, and the arm fitting couples the assembly to an arm connector assembly, and, in turn, to the arm. The shoulder assembly and the arm connector assembly are configured such that lateral forces coupled therethrough, from the arm to the spine, cause the compressible member to be compressed between its inner and outer faces and to be flexed in various directions about the spine fitting, in a manner that models the response of a human shoulder to such forces.

In accordance with another aspect of the present invention, the shoulder assembly further includes an elongated, relatively rigid clavicle embedded within the compressible member and spaced from both the spine fitting and the arm fitting. The clavicle guides deformation of the compressible member in a manner that models the characteristics of a human shoulder, and, additionally, provides the member with sufficient rigidity to permit use of the dummy in testing the effects of vehicle shoulder harnesses.

The arm connector assembly is adapted to permit the arm to be rotated in a fashion that models the characteristics of a human shoulder. To accomplish this, the connector assembly includes a laterally-oriented clevis and an associated clevis pin for coupling to the upper end of the arm, and a collar for rotatably receiving a shaft projecting from the closed end of the clevis. The collar is, in turn, secured to the arm fitting of the shoulder assembly.

In accordance with still another aspect of the present invention, the arm of the dummy includes a humerus formed of a high-strength, resilient plastic material, along with a resilient energy-absorbing foam coating overlaying the humerus. The arm thereby simulates accurately the responsiveness of a human arm to lateral forces of a type encountered in vehicle crash testing. The foam coating is preferably a closed cell foam of nitrite rubber and polyvinylchloride, and separate layers of the coating are disposed over the humerus, the coupling of the upper end of the humerus to the arm connector assembly, and a coupling of the lower end of the humerus to a lower arm.

In accordance with yet another aspect of the present invention, the dummy includes a rib cage coupled to the thoracic spine, and a rigid foam member disposed between the rib cage and the spine. The foam member is compressed inwardly, without any significant recovery, in response to any inward deflection of the rib cage, whereby any permanent compression of the member reveals both the location of impacts to the rib cage and the magnitudes of resulting rib deflections. More particularly, the foam member is formed of polyurethane foam and has no significant effect on the dynamic response of the rib cage to impacts.

Other aspects and advantages of the invention will become apparent from the following more detailed description, taken in conjunction with the accompanying drawings.

BRIEF DESCRIPTION OF THE DRAWINGS

FIG. 1 is a perspective partial view of an anthropomorphic test dummy of the present invention, showing one arm, a corresponding shoulder assembly, a thoracic spine and a head;

FIG. 2 is a front elevational view of the dummy of FIG. 1, with the arm being shown in section;

FIG. 3 is a sectional view of the shoulder assembly, taken substantially along the line 3—3 in FIG. 2;

FIG. 4 is a sectional view of the shoulder assembly, taken substantially along the line 4—4 in FIG. 2;

FIG. 5 is a top plan view of the shoulder assembly, taken substantially in the direction of the arrow 5 in FIG. 3; and FIG. 6 is a sectional view of the shoulder assembly, taken substantially along the line 6—6 in FIG. 3.

DETAILED DESCRIPTION

As shown in the exemplary drawings, particularly FIGS. 1 and 2, the present invention is embodied in an improved anthropomorphic test dummy 10, for use in the crash testing of vehicles. The dummy includes a vertically-oriented thoracic spine 12 and a pair of arms, one of which is shown at 14, that are coupled to the spine by a pair of shoulder assemblies, one of which is shown at 16. A head 18 and a rib cage (not shown) are secured to the spine, and, additionally, a number of accelerometers 20, for sensing and recording accelerations experienced by the dummy during crash testing, are also secured to the spine. When the dummy 10 is used in lateral or oblique angle vehicular crash testing, the arm 14 is contacted by a door or interior wall of the vehicle (not shown), experiencing forces and accelerations which are transmitted through the shoulder assembly 16 to the accelerometers 20.

In accordance with the present invention, each shoulder assembly 16 includes an elastically compressible member 22 such that lateral forces imparted to the arm 14 are attenuated as they are coupled to the spine 12, in a manner that models the characteristics of a human shoulder. The similarity between the shoulder assembly and a human shoulder is heightened by the pressence of a relatively rigid floating clavicle 24, enclosed within the compressible member, for guiding and limiting the deformation of the member and for providing sufficient stability to the compressible member to facilitate the use of a shoulder harness (not shown) in frontal and oblique angle impact tests. In accordance with another aspect of the present invention, the arm 14 includes a high-strength, plastic humerus 26, with an energy absorbing covering surrounding it. The arm 14 and the compressible member 22 of the shoulder assembly 16 cooperate to provide an improved dummy 10 for use in lateral and oblique angle vehicle crash testing, which simulates the actions and responses of a human body more accurately than do prior test dummies.

More particularly, as shown in FIG. 2, the shoulder assembly 16 further includes a spine fitting 28 for coupling the elastically compressible member 22 to the thoracic spine 12, and an arm fitting 30 for coupling the compressible member to an arm connector assembly 32 and, in turn, to the arm 14. The compressible member is molded of a resilient material such as butyl rubber, with a Shore durometer hardness of 45, and the spine and arm fittings are molded into the member on opposite lateral faces thereof. The shoulder assembly and the arm assembly are configured such that application of a lateral force to the arm causes the compressible member to undergo compression and to flex omnidirectionally about the spine fitting 28, in a manner that models the movement of a human shoulder. The preferred structure of the fittings 28 and 30 and the arm connector assembly 32 will be described below, after the shape of the compressible member 22 of the shoulder assembly 16 has been described.

As can best be seen in FIGS. 4 and 5, the compressible member 22 of the shoulder assembly 16 has a generally half-frusto-conical shape, with its axis aligned in a lateral direction. The annular surface of the member is oriented upwardly and adapted to be overlayed by a flesh-like material (not shown), to simulate the sloped shoulder of a human and to receive a conventional vehicle shoulder harness. The compressible member further includes a generally planar inner face 34 and a generally planar outer face 36, the outer face being located in an annular recess on the underside of the member, with a portion of the upper, sloped surface forming a lip 38 over the recess.

The inner face 34 has a semi-circular upper portion and a contiguous semi-circular lower portion, the lower portion having a radius about half that of the upper portion. In the presently preferred embodiment, the upper portion of the inner face has a radius of about $3\frac{1}{8}$ inches and the lower portion has a radius of about $1\frac{3}{4}$ inches. The outer face 36, in the presently preferred embodiment, is semi-circular in shape with a radius of about $1\frac{1}{8}$ inches and with its annular edge oriented upwardly. The outer face is spaced about $2\frac{1}{8}$ inches laterally outwardly from the inner face 34.

As shown in FIGS. 4 and 6, the spine fitting 28 is molded into the inner face 34 and the arm fitting 30 is molded into the outer face 36. The two faces are appropriately shaped and sized to carry the respective fittings such that the centerline of the spine fitting is positioned slightly below and forward of the arm fitting.

The spine fitting 28 is metallic and is configured with two integral, coaxial cylindrical portions. A first, large cylindrical portion, having a diameter of about 2 inches and a length of about $\frac{1}{4}$ inch, is embedded in the inner face 34 of the compressible member 22, and a second, smaller cylindrical portion, having a diameter of about $\frac{3}{4}$ inch and a length of about $\frac{3}{8}$ inch, projects outwardly from the inner face. A ring-shaped surface 40 in the outwardly facing end of the first, larger cylindrical portion is flush with the inner face. The second, smaller cylindrical portion is formed with a transverse through-bore 42 to receive a pin (not shown) for coupling the fitting to a conforming recess formed in the thoracic spine 12. It will be appreciated that by configuring the embedded portion of the spine fitting to have an irregular shape, the rubber material of the compressible member can be made to conformably envelope the irregular shape, thereby enhancing the bonding of the fitting.

The arm fitting 30 is also metallic, but is herein configured to be in the form of a cylinder having a diameter and length of about 1 inch. The fitting is embedded in approximately the center of the outer face 36 of the compressible member 22, with an outer, exposed surface of the fitting being flush with the face. A pair of threaded apertures 44 are located in the exposed surface, to receive a pair of retaining bolts 46 for securing the arm connector assembly 32. The embedded portion of the cylindrical arm fitting can include an axial hole 48, to provide additional surface area for engagement by the rubber material of the compressible member, thereby enhancing the bonding of the fitting.

As can best be seen in FIGS. 2 and 5, the floating clavicle 24 is an elongated brass rod and is disposed within the compressible member 22 in a generally lateral orientation. One function of the floating clavicle is to increase the resistance of the compressible member to deformation from laterally-applied forces, and to limit such deformation, thereby modeling the response of a human shoulder to such forces. Additionally, the clavicle provides sufficient stability to the compressible member to facilitate testing of the dummy 10 with a shoulder harness (not shown).

The floating clavicle 24 has a gentle "s" shape, with its inner end positioned near, but spaced from, the spine fitting 28, and with its outer end positioned in the lip portion 38 of the compressible member 22, above the arm fitting 30. Additionally, the clavicle is completely embedded within the molded compressible member and is positioned such that it is not in contact with either of the fittings.

As shown in FIG. 2, the arm connector assembly 32, for coupling the arm 14 to the shoulder assembly 16, includes a laterally-aligned clevis 50 coupled to the arm and a collar 52 coupled to the arm fitting 30 of the shoulder assembly. The connector assembly is adapted to simulate the ball-and-socket of the human shoulder, whereby the arm can be rotated about both the lateral and forward axes of the dummy 10. Additionally, the arm connector assembly is configured such that lateral forces transmitted from the arm to the shoulder assembly also produce a torque, causing the compressible member 23 of the shoulder assembly to deformably rotate downwardly and rearwardly about the spine fitting 28.

The clevis 50 includes a pair of spaced jaws for receiving the upper end of the arm 14, and the arm is secured in place by longitudinally-aligned, threaded clevis pin 54, inserted through an aperture in the arm, and two corresponding apertures near the ends of the respective jaws. This coupling permits the arm to be controllably rotated about the axis of the clevis pin. An integral, cylindrical shaft 56 projects laterally inwardly from the closed end of the clevis and this shaft is journaled in the collar 52. The shaft is prevented from movement axially relative to the collar by means of a retaining pin 58 that extends transversely through a portion of the collar aperture, to engage a corresponding annular retaining slot 60 formed in the shaft. The retaining pin includes a head at one of its ends and is threaded at its other end, to engage a corresponding threaded aperture in the collar and thus be secured thereto. The annular retaining slot extends almost completely around the clevis shaft, whereby the clevis can be controllably rotated about the lateral axis of the dummy 10 and the arm 14 thereby selectively positioned in any of a number of orientations.

The collar 52 of the arm connector assembly 32 further includes an integral lug 62 on its upper side, for use in securing the collar to the shoulder assembly 16. The lug includes a pair of apertures to receive the retaining bolts 46, for engagement with the threaded apertures in the arm fitting 30 of the shoulder assembly. The collar has a pair of generally rectangular surfaces on its upper side, adjacent the lug, that are conformably received by portions of the recess in the compressible member 22 of the shoulder assembly to further secure the collar to the shoulder assembly.

With reference to FIGS. 1 and 2, the arm 14 of the dummy 10 is shown to include the generally cylindrical humerus 26, an upper cap 64 for coupling the humerus to the clevis 50 of the arm connector assembly 32, a lower cap 66 for coupling the humerus to a lower arm 68, and an energy-absorbing coating surrounding the humerus to simulate the skin, muscle and fat tissue of a human arm. In accordance with one aspect of the invention, the humerus is formed of a high-strength, plastic material such as phenolic tubing, acetal, polycarbonate, or nylon, as contrasted with a relatively rigid metallic material. Such a resilient humerus will deflect in response to lateral forces, such as are encountered in lateral and oblique angle vehicle impacts, thereby decreasing peak forces coupled to the thoracic spine 12 and better simulating the behavior of a human humerus.

The upper cap 64 of the arm 14, which includes the forwardly-aligned aperture for coupling the arm to the clevis 50, includes on its underside a generally cylindrical recess to receive the upper end of the humerus 26. The humerus is retained by four button head screws, two of which are shown at 70, that extend through apertures in the cap to engage the humerus, and by a screw 72 that is coaxial with the humerus and that projects through the upper cap, to engage the upper end of the humerus.

In accordance with another aspect of the present invention, the humerus 26 and the upper and lower caps 64 and 66, respectively, are covered by a resilient, energy-absorbing material that acts to attenuate the forces applied to the arm during lateral impacts in substantially the same manner as would the skin, muscle and fat of a human arm. The energy-absorbing material is preferably a foamed plastic, such as a material sold under the trademark Ensolite, manufactured by Uniroyal, Inc.

The entirety of the humerus 26, lying between the upper cap 64 and the lower cap 66, is covered by a $\frac{1}{2}$ inch thick inner layer 74 of a thermoformable Ensolite type AF material, measuring approximately $5\frac{1}{2}$ inches by $5\frac{1}{2}$ inches. The Ensolite material is heated to a temperature in the range of 300°–350° F., and then wrapped around the humerus and then causing the material to thermoform over the humerus. The upper end of the arm 14, including the upper cap 64 and the screws 70 and 72 for coupling the upper cap to the humerus, are covered by a contoured layer 76 of Ensolite type AL foam material. Similarly, the lower cap 66 and the means for coupling it to the lower arm 68 are covered by a $\frac{3}{4}$ inch thick layer 78 of Ensolite type AL foam material.

In accordance with still another aspect of the invention, the dummy 10 further includes a rigid polyurethane foam member (not shown) disposed between the thoracic spine 12 and the rib cage (not shown) for measuring the magnitude of impacts on the rib cage and resulting rib deflections. The member is relatively fragile and lightweight, so it does not produce any significant change in the dynamic response of the ribs to impacts. The member crumbles, without significant recovery, in response to any inward deflection of the ribs, so whether the ribs return to their nominal positions or remain permanently deflected, the indentation of the foam member reveals both the location and magnitude of rib impacts and resulting rib deflections.

From the foregoing description, it can be seen that the present invention provides an improved anthropomorphic dummy for use in testing the occupant safety designs of vehicles involved in lateral and oblique angle crashes. The dummy has a shoulder assembly that includes an elastically compressible member, to better simulate the response of a human shoulder to lateral crash forces. Additionally, a rigid, floating clavicle is molded into the compressible member, to provide increased resistance of the shoulder assembly to deformation and to guide the deformation of the compressible member in a prescribed fashion. Further, the dummy includes an arm having a plastic humerus and a special energy-absorbing coating that combine to reduce peak force loads coupled to the spine of the dummy and to prevent the arm from penetrating padding on an interior wall of the vehicle.

While a particular form of the invention has been illustrated and described, it will be apparent that various modifications can be made, without departing from the spirit and scope of the invention. Accordingly, it is not intended that the invention be limited, except as by the appended claims.

I claim:

1. A shoulder assembly for use in coupling an arm to a thoracic spine in an anthropomorphic dummy of a type suitable for use in vehicle crash testing, said shoulder assembly comprising:
    an elastically compressible member;
    spine coupling means for coupling said compressible member to the thoracic spine;
    arm coupling means for coupling said compressible member to the arm; and
    wherein the shoulder assembly functions to couple lateral forces, of a type encountered in vehicle crash testing, from the arm to the spine, said forces being attenuated by said compressible member in a prescribed fashion.

2. A shoulder assembly as defined in claim 1, wherein in coupling a lateral force from the arm to the thoracic spine, the compressible member is compressed and rotated downwardly and rearwardly, about said spine coupling means, in a manner that models the response of a human shoulder to such a force.

3. A shoulder assembly as defined in claim 1, wherein:
    said elastically compressible member is molded of a resilient material; and
    said assembly further includes an elongated clavicle embedded within said compressible member and spaced from said spine coupling means and said arm coupling means, said clavicle being formed of a relatively rigid material and functioning to direct the deformation of the compressible member in response to a lateral force, substantially modeling the deformation a human shoulder would undergo in response to such a force.

4. A shoulder assembly as defined in claim 1, wherein:
    said elastically compressible member is molded of a resilient material and includes inner and outer faces arranged in spaced relationship;
    said spine coupling means includes a spine fitting embedded in the inner face of said compressible member; and
    said arm coupling means includes an arm fitting embedded in the outer face of said compressible member.

5. A shoulder assembly as defined in claim 4, wherein:
    the outer face formed in said compressible member is located in a recess formed in the underside thereof; and
    said shoulder assembly further includes an elongated, relatively rigid clavicle embedded, within said compressible member and spaced from said spine fitting and said arm fitting, said clavicle having an inner end located near the spine fitting and an outer end located above and laterally outwardly of the arm fitting.

6. A shoulder assembly as defined in claim 4, wherein said arm coupling means further includes means for permitting the arm to be selectively rotated about two substantially perpendicular axes, in a manner that models the movement capability of a human shoulder.

7. A shoulder assembly as defined in claim 6, wherein said means for permitting includes:
    a laterally-aligned clevis and associated clevis pin for coupling to the upper end of the arm, said clevis including an integral shaft projecting in a lateral direction from the closed end thereof;
    a collar having an aperture for rotatably receiving the shaft of said clevis; and
    means for fixedly securing said collar to said arm fitting.

8. A shoulder assembly as defined in claim 1, wherein said compressible member includes an upper surface configured to simulate the curved and sloped surface of a human shoulder, thereby permitting use of the dummy in testing the effects of vehicle shoulder harnesses.

9. An arm and shoulder assembly for use in an anthropomorphic dummy of a type suitable for use in vehicle crash testing, wherein the arm and shoulder assembly functions to couple laterally-applied forces to a thoracic spine of the dummy, said arm and shoulder assembly comprising:
    an arm;
    a molded, elastically compressible shoulder member having inner and outer faces formed therein, said faces arranged in spaced relationship to each other;
    a spine fitting embedded in the inner face of said compressible shoulder member for coupling the assembly to the thoracic spine of the dummy;
    an arm fitting embedded in the outer face of said compressible shoulder member;
    a relatively rigid, elongated clavicle molded within said compressible shoulder member and spaced from said spine fitting and said arm fitting; and
    means for coupling said arm to said arm fitting;
    wherein lateral forces of a type encountered in vehicle crash testing are coupled through the arm and shoulder assembly to the thoracic spine, said lateral forces being attenuated by said compressible shoulder member in a prescribed fashion; and
    wherein said compressible shoulder member and said means for coupling are configured such that the compressible shoulder member is compressed and moved omnidirectionally by such lateral forces, in a manner that models the response of a human shoulder.

10. An arm and shoulder assembly as defined in claim 9, wherein said arm comprises:
    a plastic humerus; and an energy-absorbing coating overlaying said humerus, said coating being formed of a closed cell foam materal;

whereby whenever a lateral force is applied thereto, the arm compresses and deflects in a manner that models the characteristics of a human arm.

11. An anthropomorphic dummy for use in vehicle crash testing, said dummy comprising:
a thoracic spine;
an arm; and
a shoulder assembly for coupling lateral forces, of a type encountered in vehicle crash testing, from said arm to said thoracic spine, said shoulder assembly including
an elastically compressible member,
spine coupling means for coupling said compressible member to said thoracic spine, and
arm coupling means for coupling said arm to said compressible member;
wherein in coupling lateral forces from said arm to said thoracic spine, the compressible member functions to attenuate the forces in a prescribed fashion.

12. An anthropomorphic dummy as defined in claim 11, further including:
a rib cage coupled to said thoracic spine; and
a rigid foam member disposed between said rib cage and said thoracic spine, said foam member being compressed inwardly, without any significant recovery, in response to inward deflection of said rib cage, whereby any permanent compression of the foam member reveals both the location of impacts to the rib cage and the magnitudes of resulting rib deflections.

13. An anthropomorphic dummy as defined in claim 12, wherein said foam member is formed of polyurethane and has no significant effect on the dynamic response of the rib cage to impacts.

* * * * *